US011553046B1

(12) United States Patent
Kuznetsov et al.

(10) Patent No.: US 11,553,046 B1
(45) Date of Patent: Jan. 10, 2023

(54) SEAMLESS SCALING VIA PROXY REPLAY OF SESSION STATE

(71) Applicant: Amazon Technologies, Inc., Seattle, WA (US)

(72) Inventors: Alexey Kuznetsov, New Westminster (CA); Sandor Loren Maurice, Vancouver (CA); Alok Nandan Nikhil, Seattle, WA (US); Joseph Andrew Tucek, Palo Alto, CA (US); Alexandre Olegovich Verbitski, Woodinville, WA (US); Lawrence Webley, Seattle, WA (US); Tengiz Kharatishvili, Sammamish, WA (US); Bohan Liu, Seattle, WA (US); Mushahid Alam, Seattle, WA (US); Kamal Kant Gupta, Snoqualmie, WA (US); Debanjan Saha, Los Altos, WA (US); Anurag Windlass Gupta, Atherton, CA (US); Saileshwar Krishnamurthy, Palo Alto, CA (US)

(73) Assignee: Amazon Technologies, Inc., Seattle, WA (US)

(*) Notice: Subject to any disclaimer, the term of this patent is extended or adjusted under 35 U.S.C. 154(b) by 695 days.

(21) Appl. No.: 15/717,789

(22) Filed: Sep. 27, 2017

(51) Int. Cl.
*H04L 29/08* (2006.01)
*H04L 12/751* (2013.01)
(Continued)

(52) U.S. Cl.
CPC ............ *H04L 67/148* (2013.01); *H04L 45/02* (2013.01); *H04L 67/141* (2013.01); *H04L 63/08* (2013.01); *H04L 67/01* (2022.05)

(58) Field of Classification Search
CPC ...... H04L 67/148; H04L 45/02; H04L 67/141
See application file for complete search history.

(56) References Cited

U.S. PATENT DOCUMENTS

| 7,644,410 | B1 * | 1/2010 | Graupner | G06F 9/5011 |
| | | | | 718/104 |
| 7,702,791 | B2 * | 4/2010 | Halpern | H04L 29/06 |
| | | | | 709/227 |

(Continued)

OTHER PUBLICATIONS

"Maria DB MaxScale—Database Proxy—Database Security, HA", Retrieved from URL: https://mariadb.com/products/technology/maxscale on Sep. 6, 2017, pp. 1-4.

(Continued)

*Primary Examiner* — Esther B. Henderson
*Assistant Examiner* — Nazia Naoreen
(74) *Attorney, Agent, or Firm* — Robert C. Kowert; Kowert, Hood, Munyon, Rankin & Goetzel, P.C.

(57) ABSTRACT

A service provider network implements seamless scaling via proxy replay of session state. Upon a trigger, such as a determination to scale a server, a scaled server may be spun up and an identifier of the scaled server provided to a first (existing) server. The first server sends the identification of the second server, and session state information for each of the connections between the first server and the request router, to the request router. For each of the connections, the request router establishes a new connection between the request router and the second (scaled) server, and replays the session state information for the connection to the second server. The request router then routes traffic between each existing client connection (e.g., the same existing client connection which carried traffic delivered to the first server) and the corresponding new connection to the second server.

20 Claims, 8 Drawing Sheets

(51) Int. Cl.
*H04L 67/148* (2022.01)
*H04L 67/141* (2022.01)
*H04L 45/02* (2022.01)
H04L 9/40 (2022.01)
H04L 67/01 (2022.01)

(56) References Cited

U.S. PATENT DOCUMENTS

| | | | | |
|---|---|---|---|---|
| 7,840,683 | B2* | 11/2010 | Zhang | H04L 67/1019 |
| | | | | 709/227 |
| 7,925,749 | B1* | 4/2011 | Lin | G06F 16/1844 |
| | | | | 709/215 |
| 10,348,812 | B2* | 7/2019 | Kumar | H04L 67/32 |
| 10,564,870 | B1* | 2/2020 | Greenwood | G06F 3/0647 |
| 2003/0187871 | A1* | 10/2003 | Amano | H04L 67/563 |
| | | | | 707/999.102 |
| 2007/0226214 | A1* | 9/2007 | Smits | H04L 67/1008 |
| 2011/0191477 | A1* | 8/2011 | Zhang | G06F 15/173 |
| | | | | 718/1 |
| 2013/0067095 | A1* | 3/2013 | Kruse | H04L 69/14 |
| | | | | 709/227 |

OTHER PUBLICATIONS

"ProxySQL", Retreived from URL: http://www.proxysql.com/#features on Sep. 6, 2017, pp. 1-11.
ScaleArc, "How it works", Retrieved from URL: http://www.scalearc.com/how-it-works on Sep. 6, 2017, pp. 1-12.

* cited by examiner

SEAMLESS SCALING VIA PROXY REPLAY OF SESSION STATE

BACKGROUND

Commoditization of computer hardware and software components has led to the rise of service providers that provide computational and storage capacity as a service. At least some of these services (e.g., managed services such as relational database services) are difficult to scale. Scaling the processing capacity can be especially difficult.

Disruption of an application or other process can be a high cost associated with changing capacity to better match workloads. For instance, some existing scaling processes interrupt client applications with dropped connections (low quality applications may not even retry to connect, in some instances).

In a particular example, scaling relational databases based on workload fluctuations is difficult at least because adding (or withdrawing) supporting resources cannot be done easily without workload interruptions, dropped connections or expensive hardware. Even the expensive hardware can require an interruption (e.g., a restart) to change the amount of resources (e.g., processing power or memory) available to service requests. Such interruptions do not provide a seamless transition from the client's point of view since the connection between the client and the service may be dropped or interrupted.

Another solution has been to over-provision capacity in order to handle request surges. But, over-provisioning forces customers to purchase more capacity than is always needed, and also results in some portion of the provisioned resources sitting idle at least some of the time when those resources could be performing other work.

Some systems rely upon proprietary control logic in a proxy for scaling, but such logic only works with a limited set of existing client software. For example, the proprietary logic in the proxy has to understand the particularities of the protocols used by the existing software. Other systems require extreme cooperation between clients.

Figure 1A:
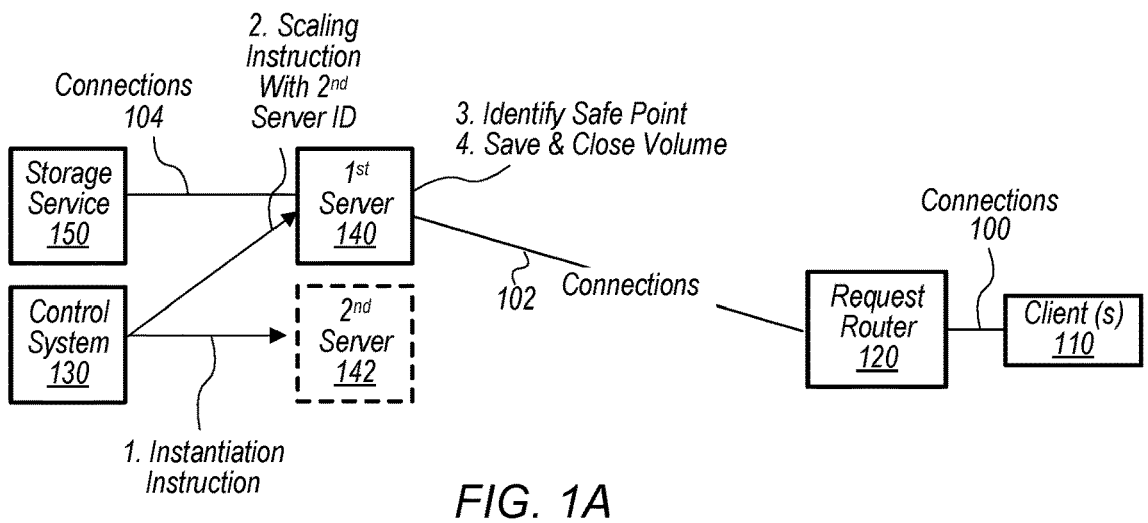
FIGS. 1A-1D depict an example architecture of a system, and a corresponding technique for seamless scaling via proxy replay of session state, according to at least some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of seamless scaling via proxy replay of session state are disclosed. Embodiments implement a transparent session transfer from a prior server (e.g., a backend server) to another server without being disruptive of the incoming workload (e.g., from a client process) or without the customer even knowing that the transfer was performed at all (e.g., in the case of server failure or automated scaling process). Session transfer may be performed via a request router, for example. In some embodiments, the transfer of session state information via the request router depends upon little to no additional control logic in the request router.

In contrast to systems that rely upon proprietary control logic for scaling, support across a broad range of existing software may be enabled by at least some techniques disclosed herein that depend upon little to no additional control logic in the request router. For instance, in some embodiments, the techniques disclosed herein minimize the amount of additional logic needed at the request router (e.g., the request router may not track the session state, but acts as a relay of the session state from the first server to the second server).

For instance, a request router that routes requests between clients and servers of a service provider may, in some embodiments, act as a conduit through which session state information for connections between an existing server and request router is transferred from the existing server to a scaled server. The transfer may be performed while the connections between the client and the request router are maintained to provide the client with a seamless scaling experience that moves the connections from the existing server to the scaled server without the client perceiving interruptions. It is notable that some session failover transfers are known, but customers suffer lost connections as part of these failover transfers and are thus, not seamless session transfers.

In some embodiments, the technique is applicable to any of various protocols (e.g., database protocols) or existing client software instead of being particular tailored to a specific protocol or workload, at least partly because the request router acts as a relay, instead of the request router having additional logic that understands the particular protocol or workload. In some embodiments, the disclosed technique may be implemented as an extension to a protocol (e.g., a database protocol or the like) that extracts session state and relays the session state to a scaled server while keeping connections to a client (e.g., a client application or the like) open.

In some embodiments, the techniques disclosed herein may be used to perform a transparent release of resources (e.g., on a backend) without a client process having to drop the connections to the backend, allowing a resource to be, released, shut down or off-line for a period of time, for example. The techniques disclosed herein may also be used to transparently allocate a resource for a customer that resumes a workload (e.g., resumes a workload against a database). In some embodiments, the techniques described herein may be used to transparently transfer sessions from a prior backend server to another backend server without disruption of an incoming workload.

In an example embodiment, a scaling event is triggered. For example, a client administrator may request, or a process executing on the server, or a control plane process may determine that the server be scaled more appropriately for the load being served. A scaled server may be spun up and an identifier of the scaled server provided to the first server along with credentials for authentication, in embodiments. The request router that routes traffic for each connection between the first server and a corresponding existing client connection receives, from the first server, the identification of the second server, and session state information for each of the connections handled by a first server between the first server and the request router. For each of the connections, the request router establishes a new connection between the request router and the second server, and replays the session state information over the connection to the second server. The request router then routes traffic between each existing client connection (e.g., the same existing client connection which carried traffic delivered to the first server) and the corresponding new connection to the second server.

In large scale systems, running and maintaining a separate control system for tracking the connections among requests routers and servers may be prohibitive. In embodiments, the old server may be used as a conduit for the request router to identify the new server without using a separate control system (e.g., without using a separate management interface into the request router). For instance, the old server may self-identify (e.g., based on a measurement of capacity) that a scaling operation is desirable, or a client administrator may trigger a scaling operation that the control system passes to the old server.

In embodiments, the existing server is configured to send the identification of the new server and the session state information over the same connection between the existing server and the request router that is used to carry traffic from the client connection from the request router to the existing server. For example, a specialized packet may trigger the existing server to send the identification of the new server and the session state information.

In some embodiments, the request router may be implemented as a client-side driver.

FIGS. 1A-1D depict an example architecture of a system, and a corresponding technique for seamless scaling via proxy replay of session state, according to at least some embodiments. Any of the illustrated components (e.g., client(s) 110, request router 120, control system 130, first server 140, second server 140, storage service 150) may be implemented as a computer system, such as the computer system illustrated in FIG. 8 for example (described below).

In various embodiments, various of the components may be implemented as part of a service provider system that provides network-based compute and storage services (e.g., via a network of virtual instances) to various clients and/or client networks. For instance, request router 120, control system 130, first server 140, second server 140, storage service 150 may all be implemented on various virtual instances of a service provider network, and client(s) 110 may be implemented on client networks distinct from the service provider network. In some embodiments, the client(s) may be implemented on virtual instances of the service provider network on behalf of a customer of the service provider.

Figure 3:
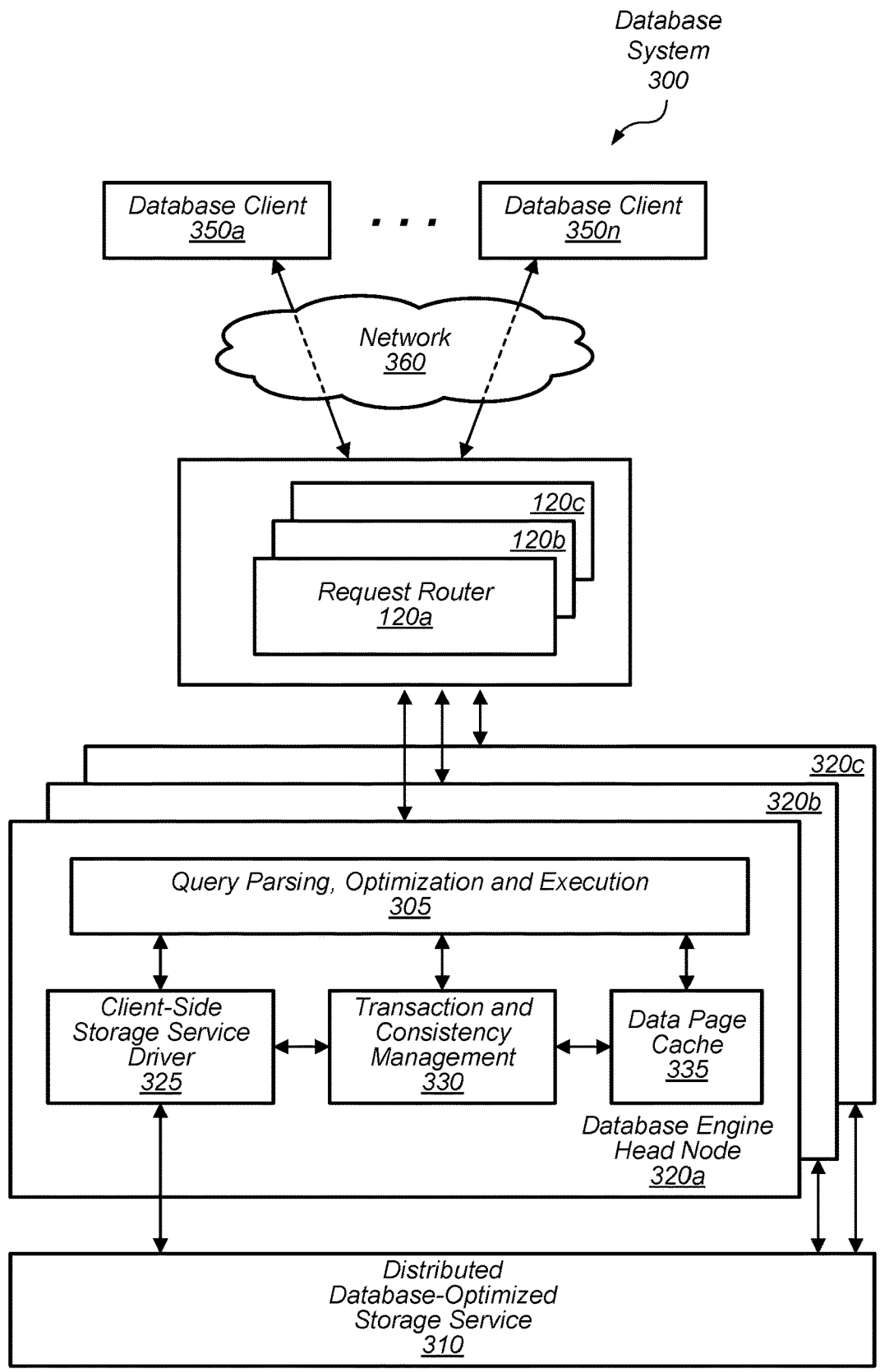
FIG. 3 is a block diagram illustrating various components of a database system that includes a database engine of a database server and a separate distributed database storage service, according to one embodiment.

In at least one example, the client(s) 110, request router 120, first server 140, second server 140, and storage service 150 of FIGS. 1A-1D correspond to database client 350*a-n*, database engine head node 320*a*, database engine head node 320*b*, and distributed database-optimized storage service 310 of FIG. 3.

Client(s) 110 is intended to be interpreted broadly. For example, client(s) 110 may include client devices or client networks of customers of a service provider, or applications or processes operated on behalf of or by a customer of a service provider. For instance, a process depicted as client(s) 110 in FIG. 1 may be implemented as an application that is executed on virtual machines of a server provider on behalf of a customer of the service provider or as an application executed on a client network distinct from a service provider network that implements the other components depicted in FIGS. 1A-D.

Various components of FIGS. 1A-1D may perform some of the steps illustrated in the processes depicted in FIGS. 2, and 4-7 and described below. Although some embodiments are directed to seamlessly scaling a server, the techniques described herein are not limited server scaling. For example, at least some of the techniques may be applied to allow a server to go "off-line" while maintaining existing client connections (e.g., so that the client is not charged for the active server or for other reasons, etc.).

In at least the illustrated embodiment, it has been determined that an active server is to be scaled (e.g., determined by the first server that is processing a workflow, by a control system 130, or otherwise). In the illustrated embodiment, a control system 130 initiates a scaling process by sending 1. an instruction to instantiate a second server 142, and by sending 2. a scaling instruction and identification of the second server to a first server 140. In FIG. 1A, first server 140 is illustrated as 3. identifying a safe point, and 4. saving data to a volume of the storage service 150 and closing the volume. This may cause the connection 104 between the storage service 150 and the first server to be closed, for example.

Figure 1B:
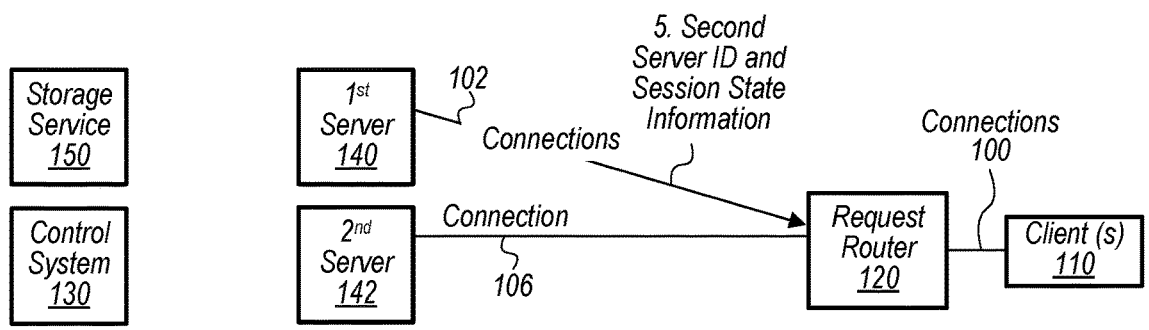

FIG. 1B depicts the first server 140 sending 5. the identification of the second server and session state information to the request router 120 via connections 102. For example, as explained below, the identification of the second sever may be sent in a termination packet to the request router, and the session state information may follow the termination packet. FIG. 1B illustrates that a new connection 106 is established by the request router (e.g., based at least in part on the identification of the second server received from the first server).

Figure 1C:
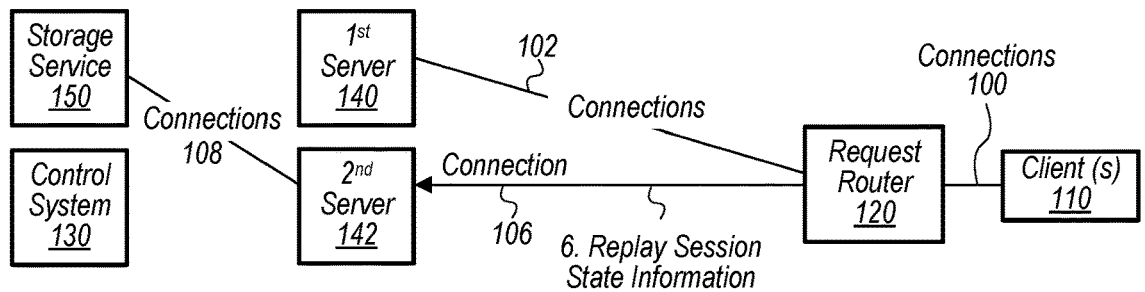

FIG. 1C illustrates (at 6.) that the request router 120 replays the session state information over the new connection 106 to the second server. Replaying of the session state information may re-establish the sessions that existed on the first server, in embodiments. FIG. 1C illustrates that connection 108 has been established between second server 142 and storage service 150. The connection 108 may be to the same data source of connection 104 such that the data used to respond to requests in the traffic over connections 102 with the first server and used to respond to requests in the traffic over new connections 106 to the second server is sourced from the same data source, without changing the source of the data.

Figure 1D:
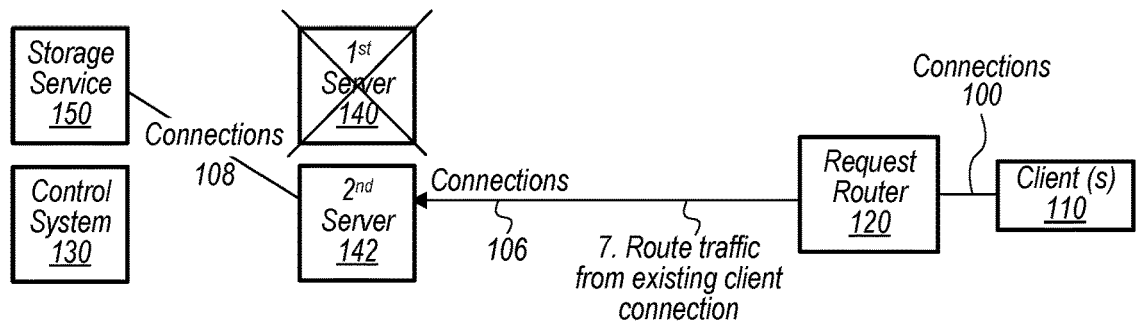

FIG. 1D illustrates (at 7.) that the request router 120 routes traffic from the existing client connection 100 via the new connection 106 to the second server. In embodiments, the second server 142 services requests in the traffic by obtaining client data from the same data store of storage service 150 that the first server used in FIG. 1A. FIG. 1D also depicts (with a big X) that the first server instance may be returned to a resource pool (e.g., after all the connections from the first server have been transferred to the second server).

Figure 2:
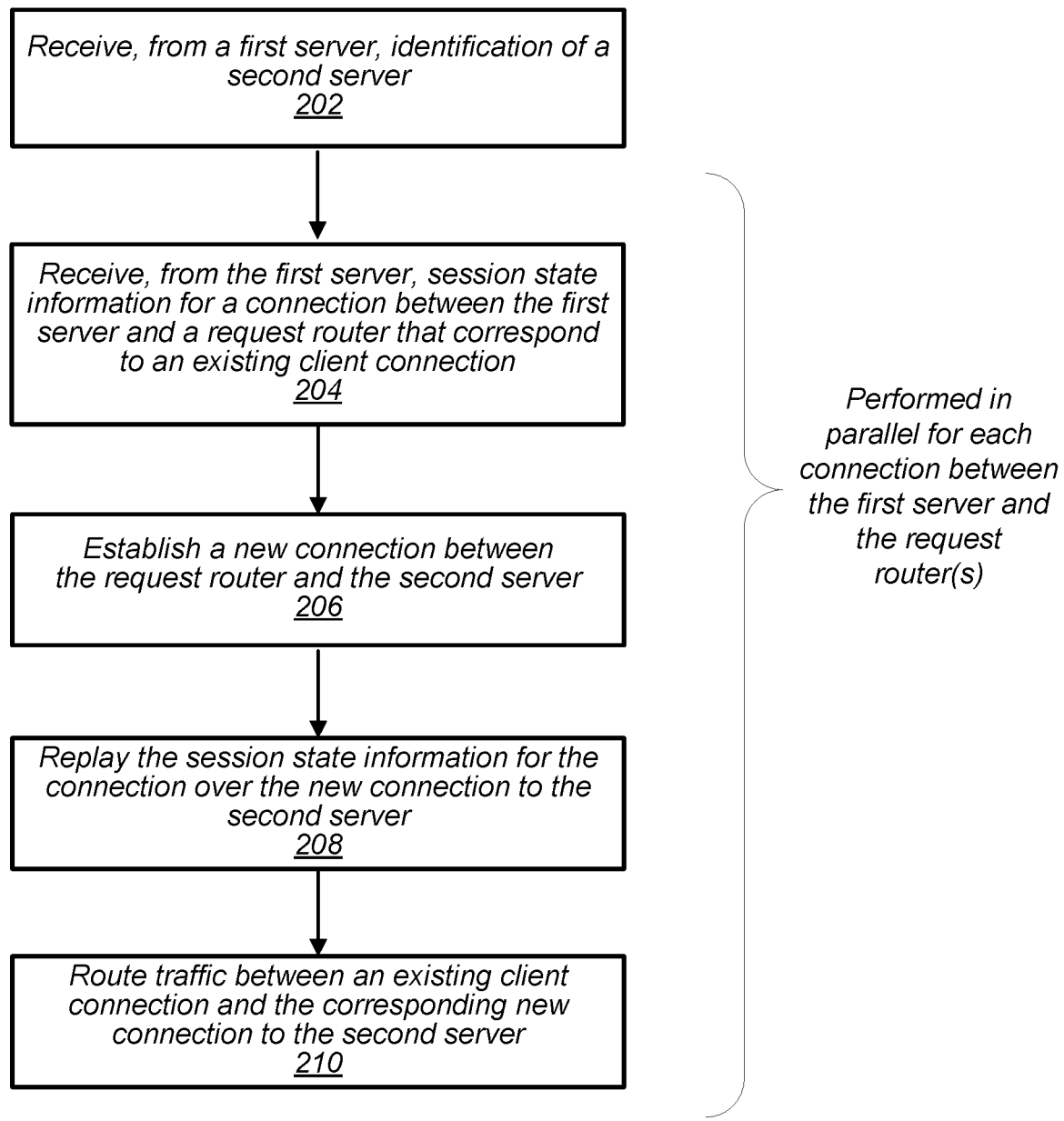
FIG. 2 is a flow chart illustrating a technique for seamless transfer of connections via proxy replay of session states, according to at least some embodiments.

FIG. 2 is a flow chart illustrating a technique for seamless transfer of connections via proxy replay of session states, according to at least some embodiments. In some embodiments, one or more of the steps illustrated in FIG. 2 may be implemented by the components depicted in FIG. 1, 3 or 8. For instance, the request router 120 of FIG. 1 may perform at least some of the steps in FIG. 2. FIGS. 4-7 may expand upon the steps illustrated in FIG. 2, in embodiments.

FIG. 2 illustrates (at block 202) that an identification of a second server is received from a first server. For instance, request router 120 receives the identification of the second server 142 from first server 140.

FIG. 2 illustrates that the steps in blocks 204-210 may be performed in parallel for each connection between the first server and the request router(s). Other combinations are contemplated without departing from the scope of the disclosure. For example, in at least some systems, a first server may have multiple connections with multiple request routers (e.g., FIG. 3 illustrates request routers 120*a-c* with connections to database engine head nodes 320*a-c*). In some embodiments, a first server may perform steps 204-210 not only for each connection to a particular request router, but for each connection with other request routers as well.

Block 204 illustrates that session state information for a connection between the first server and a request router that corresponds to the existing client connection is received from a first server. For instance, request router 120 receives the session state information from first server 140 about one of the connections 102. Although various embodiments describe that the session state information corresponds to a particular connection of the connections (e.g., connections 102), the session state information may be organized otherwise, such as corresponding to a particular process, such as an application, for example, in embodiments.

Block 206 illustrates that a new connection is established between the request router and the second server. For instance, request router 120 establishes a new connection 106 with second server 142. Block 208 illustrates that the session state information for the connection is replayed over the new connection to the second server (by request router 120, for example).

Block 210 illustrates the traffic is routed between an existing client connection and the corresponding new connection to the second server. For instance, request router 120 routes traffic from existing client connection 100 to the second server 142 via new connection 106.

The techniques disclosed herein may be performed in various type of server-based systems, such as, but not limited to, compute or storage services of a network-based service provider. As one of many possible examples, FIG. 3 is a block diagram illustrating various components of a database system 300 that includes a database engine and a separate distributed database storage service, according to one embodiment. Various components of the illustrated database system 300 may perform some of the steps illustrated in FIGS. 1, 2, and 4-7, in embodiments. Various of the components illustrated in FIG. 3 may be implemented via various computer systems (e.g., such as the computer system illustrated in FIG. 8, described below).

In this illustrated example, database system 300 includes a respective database engine head node 320 for each of several databases and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed database-optimized storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, log record manipulation, and/or space management operations in a manner that is invisible to storage clients 350a-350n.

In embodiments, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this illustrated example, database engine head node 320a includes a data page cache 335, in which data pages that were recently accessed may be temporarily held (e.g., similarly, first server 140 in FIG. 1 may cache data from storage service 150, in FIG. 1). As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed to that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Safe Point

In embodiments, the safe point identified prior to closing the volume (e.g., depicted in blocks 406/408, described below) is based upon data such as the status of the various transactions tracked by transaction and consistency management component 330. In some embodiments, a safe point defines when there are no active transactions being processed. In some embodiments, a safe point may be identified despite pending work (e.g., items coming to the process over the network). A safe point may be defined for an entire volume, such as for a database, in some instances.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed database-optimized storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. The storage nodes may be configured to receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
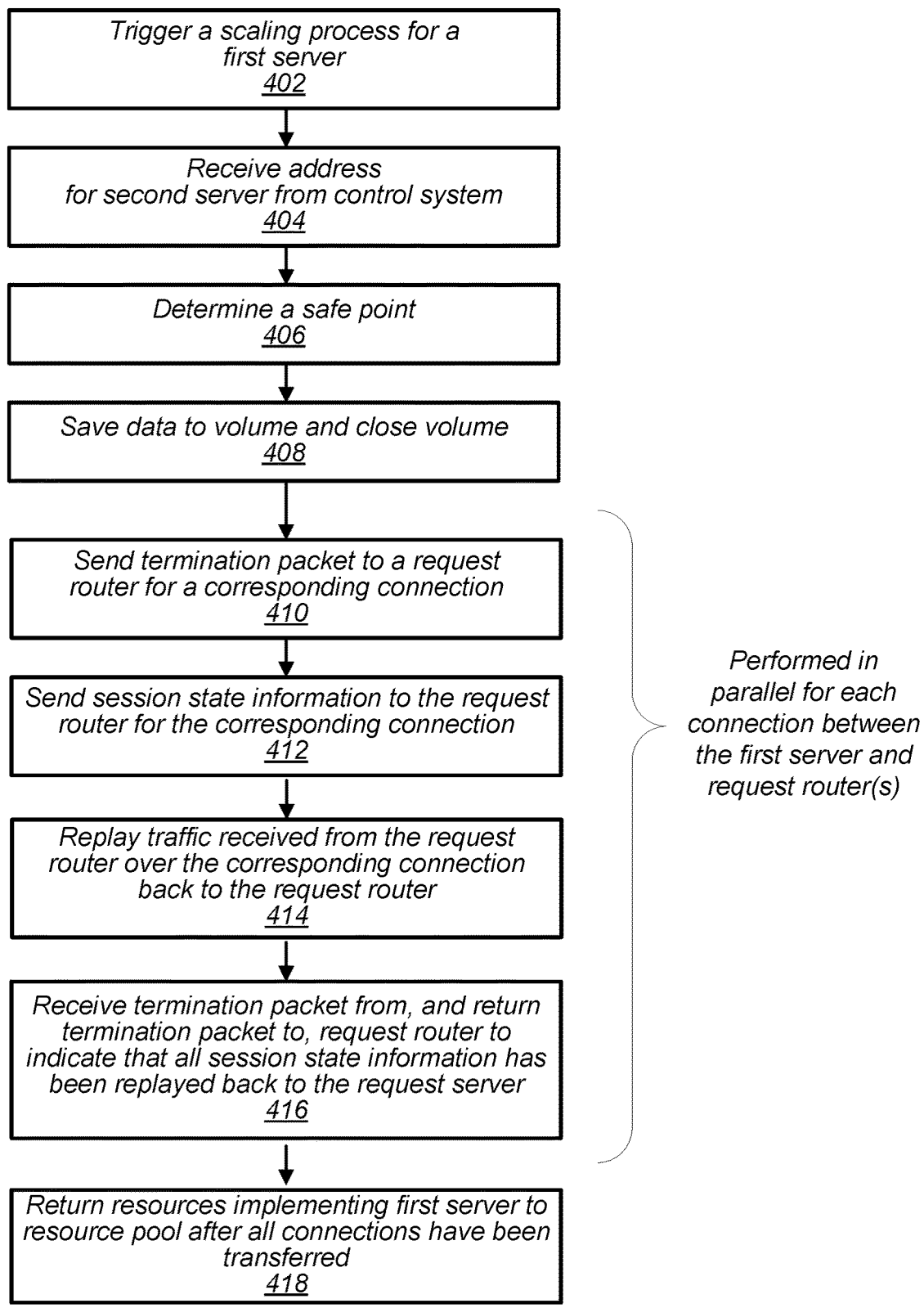
FIG. 4 is a flow chart illustrating a technique for seamless scaling via proxy replay of session state, according to at least some embodiments.

FIG. 4 is a flow chart illustrating a technique for seamless scaling via proxy replay of session state, according to at least some embodiments. The steps illustrated in FIG. 4 may be performed by various components describe herein, or by other components not disclosed, in some embodiments. In at least the illustrated embodiment, while steps 402 and 418 may be performed by either a control system or a first server, for example, steps 404-416 are performed by the first server.

A scaling process for a server is triggered (block 402). For example, control system 130 may determine that the workload for the first server 140 has reached a minimum or maximum threshold, or the control system 130 may receive an instruction from a client (e.g., from an administrative process or the like) and may trigger the scaling process. An address for the second server is received from the control system (block 404). For instance, once a scaling process has been initiated, the control system may perform some analysis of the workload to determine the amount to scale the first server or an administrator may provide the amount to scale the first server. In some embodiments, the control system may instruct instantiation of a second server of the desired scale. In some embodiments, the control system may obtain the identification of an already-instantiated server of the desired scale. In either case, the control system may determine an address for the second server and provide the address to the first server.

A safe point is determined (block 406). For instance, as explained above, identifying the safe point in the processing may be based on a status of transactions corresponding to data stored in the volume of the data store. In embodiments, the safe point indicates that there are no active transactions associated with the corresponding connection.

Data is saved to the volume and the volume is closed (block 408). For example, the transaction and consistency management component 330 in FIG. 3, which may be responsible for providing transactionality and consistency in the database instance of which database engine head node 320a is a component that may be responsible for ensuring the Atomicity, Consistency, and Isolation properties of the database instance and the transactions that are directed to that the database instance. In the illustrated embodiment, the transaction and consistency management component 330 may ensure the Atomicity, Consistency, and Isolation properties of the volume before the volume is closed.

In some embodiments, the connections 102 may all be associated with one volume. In some embodiments, individual ones of the connections 102 may be associated with multiple volumes. At least steps 406 and/or 408 may be performed in parallel or serially for multiple volumes for the first server, in embodiments.

FIG. 4 illustrates that steps 410-416 may be performed in parallel for each connection between the first server and the corresponding request router(s). For instance, FIG. 3 illustrates that multiple request routers 120a-c may have various connections with database engine head nodes 320a-c.

Block 410 illustrates that a termination packet is sent to a request router for a corresponding connection and block 412 illustrates that session state information is sent to the request router for the corresponding connection. In one example, first server 140 sends a termination packet with the address of or an identifier for the second server to request router 120, followed by session state information for the connection.

In some embodiments, the first server may be put into or may enter a replay mode. In such a mode, traffic received from the request router over the corresponding connection is replayed over the corresponding connection back to the request router. For example, first server 140 replays traffic received over one of connections 102 back to request router 120 over the one of the connections 102. In some embodiments, the request router may stop sending packets from the existing client connection to the first server and may instead send packets intended for the first server to the second server.

A termination packet is received from, and returned to the request router to indicate that all session state information has been replayed back to the second server (block 416). For instance, receipt by the request router, of the termination packet sent by the request router, indicates that any packets sent to the first server prior to the first server sending the termination packet have been handled.

Block 418, in combination with the explanation that blocks 410-416 are performed in parallel for each connection between the first server and the request router(s), illustrate that once all of the termination packets have been returned to the request router, all the session state information for the connections has been transferred to the new server(s) and the resources implementing the first server may be returned to a resource pool.

Figure 5:
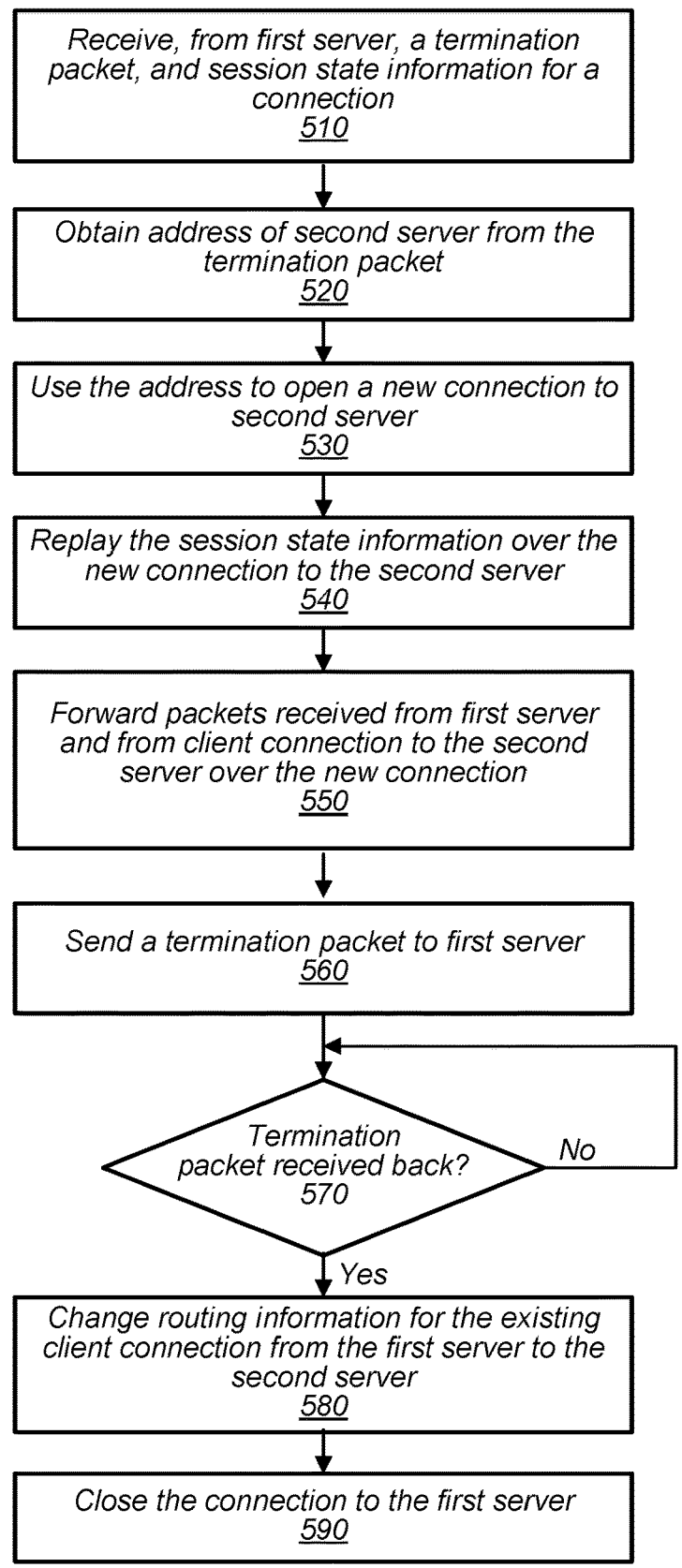
FIG. 5 is a flow chart illustrating a technique for seamless scaling via proxy replay of session state, according to at least some embodiments.

FIG. 5 is a flow chart illustrating a technique for seamless scaling via proxy replay of session state, according to at least some embodiments. The steps illustrated in FIG. 5 may be performed by various components describe herein, or by other components not disclosed, in some embodiments. In at least the illustrated embodiment, steps 510-590 are performed by the request router.

A termination packet and session state information for a connection are received from a first server (e.g., the termination packet and session state information for one of the connections 102 is received by request router 120 from first server 140). The address of the second server is obtained from the termination packet (block 520), and the address is used to open a new connection to the second server (block 530). For instance, request router 120 obtains the address of the second server and uses the address to open a new connection to the second server. In some embodiments, credentials that are also obtained via the termination packet are used to authenticate the request router to the second server. The credentials may have been provided to the first server by the control system, in some embodiments.

The session state information is replayed over the new connection to the second server (block 540), by the request router 120, for example. Packets received from the first server, and packets from the client connection are forwarded to the second server over the new connection (block 550), by the request router 120, for example.

At block 560, a termination packet is sent to the first server. For instance, the termination packet may be sent as a sweep operation that ensures no session information such as packets from the client connection are lost when the connection is closed. At block 570, if no termination packet is received back, the process waits until the termination packet is received back (580, yes). For instance, the first server may process or forward packets that are queued in front of the termination packet before returning the termination packet to the request router 120. In some embodiments, step 580 may occur earlier in the process than depicted in FIG. 5.

At block 590, routing information for the existing client connection is changed (e.g., routing information of the request router) from the first server to the second server, and the connection to the first server is closed (e.g., when all of the connections have been transferred away from the first server).

Figure 6:
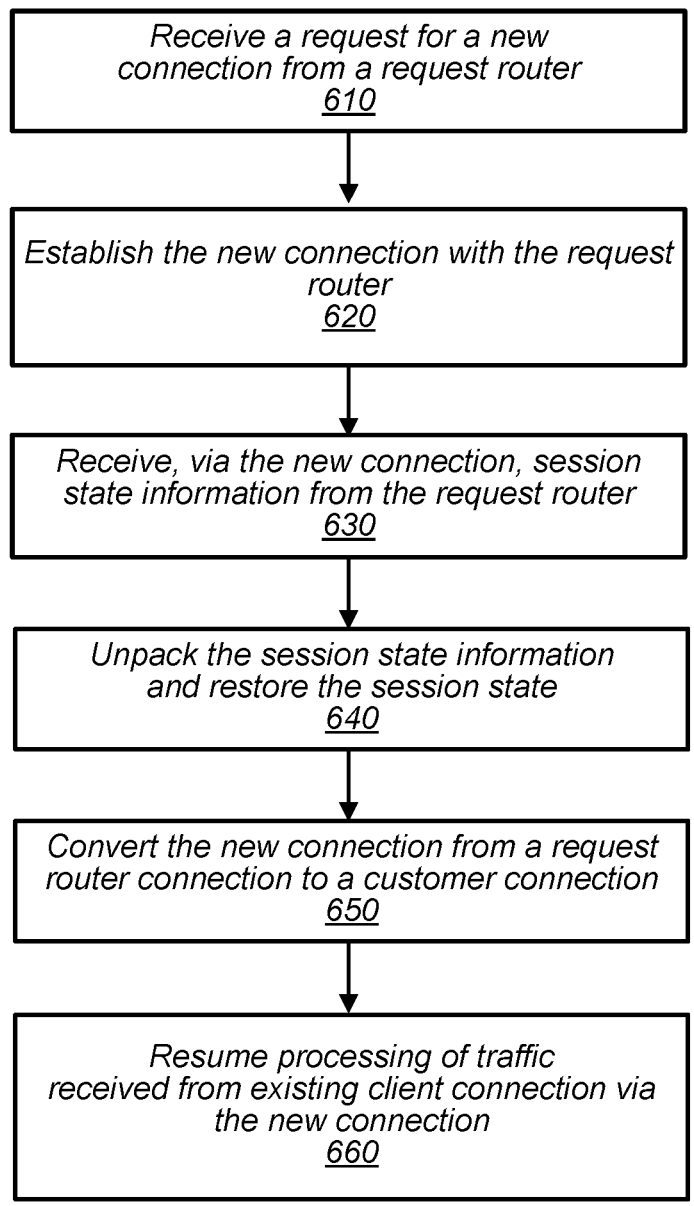
FIG. 6 is a flow chart illustrating a technique for seamless scaling via proxy replay of session state, according to at least some embodiments.

FIG. 6 is a flow chart illustrating a technique for seamless scaling via proxy replay of session state, according to at least some embodiments. The steps illustrated in FIG. 6 may be performed by various components describe herein, or by other components not disclosed, in some embodiments. In at least the illustrated embodiment, steps 610-660 are performed by the second server (e.g., second server 142).

At block 610, a request for a new connection is received from the request router (e.g., by the second server 142). For instance, the request router may use an address or other identifier obtained from a first server to request a new connection with the second server.

The new connection with the request router is established (block 620). In some embodiments, credentials received by the request router 120 from the first server 140, or from the control system 130 may be used to authenticate the request router to the second server to establish the new connection.

Session state information is received from the request router via the new connection (block 630). For example, the second server 142 receives the session state information from the request router via new connection 106. The session state information is unpacked (e.g., by the second server) and the session state restored (block 640).

In at least the illustrated embodiment, the new connection is converted from a connection owned by the request router to a customer connection (block 650), and processing of the traffic received from the existing client connection via the new connection is resumed (block 660). In some embodiments, one or more of the steps 610, 620, 630, 640, 650, 660 may be performed using the same channel (e.g., the channel or link used to the set up the connection may be the same channel or link used to receive the session state information and may be the same channel or link used to resume the processing of traffic from existing client connection). This contrasts with implementations where a control layer or control system or other entity sets up a channel or connection to transfer the session state information that is a different channel of connection from that used to resume processing of traffic received from the existing client connection, in some examples.

Figure 7:
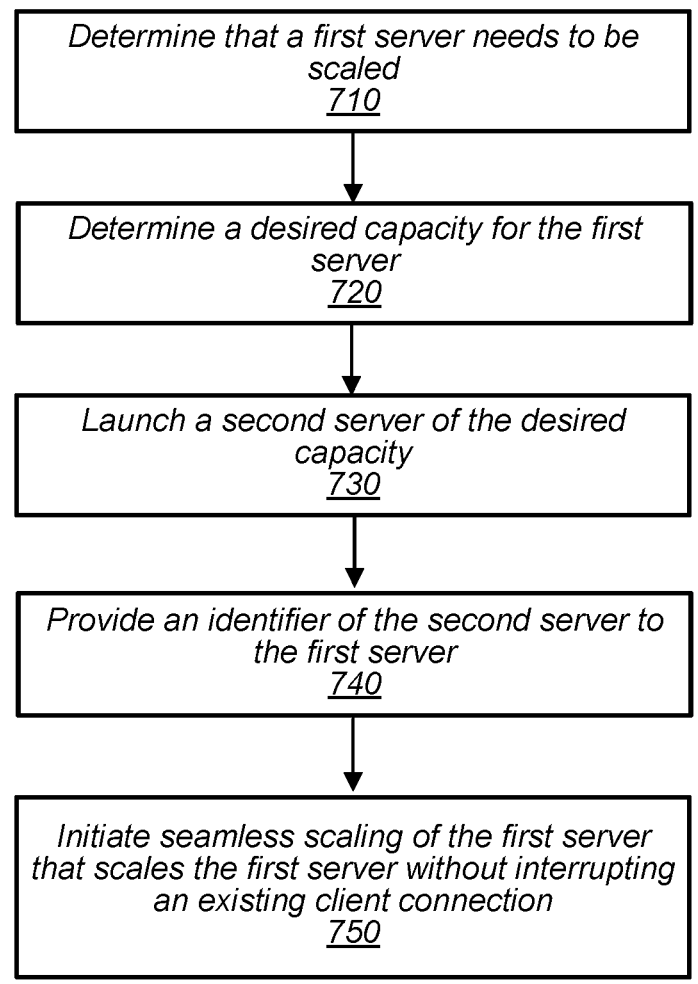
FIG. 7 is a flow chart illustrating a technique for seamless scaling via proxy replay of session state, according to at least some embodiments.

FIG. 7 is a flow chart illustrating a technique for seamless scaling via proxy replay of session state, according to at least some embodiments. The steps illustrated in FIG. 7 may be performed by various components describe herein, or by other components not disclosed, in some embodiments. In at least the illustrated embodiment, steps 710-750 are performed by a control system (e.g., control system 130).

It is determined that a first server needs to be scaled (block 710) and a desired capacity for the first server is determined (block 720). For example, an automated server workload and scaling process of a control system or of the first server may determine that the first server has too great or too little workload and that the first server should be scaled. In another example, an administrator of a customer may determine that the first server should be scaled. The automated server workload and scaling process of a control system or the administrator may analyze the workload and available server capacities and determine a desired capacity for the first server, in embodiments.

A second server of the desired capacity is launched (block 730) and an identifier of the second server is provided to the first server (block 740). For instance, control system 130 may instruct instantiation of a second server with the specified capacity and provide an identifier of the second server, such as an address of the second server to the first server. In some embodiments, the control system may identify an existing server of the specified capacity from an existing pool of servers.

Seamless scaling of the first server that scales the first server without interrupting an existing client connection is initiated (block 750). For instance, control system 130 may instruct first server 140 to begin a scaling process that includes sending the identifier of the second server and session state information to a request router.

Figure 8:
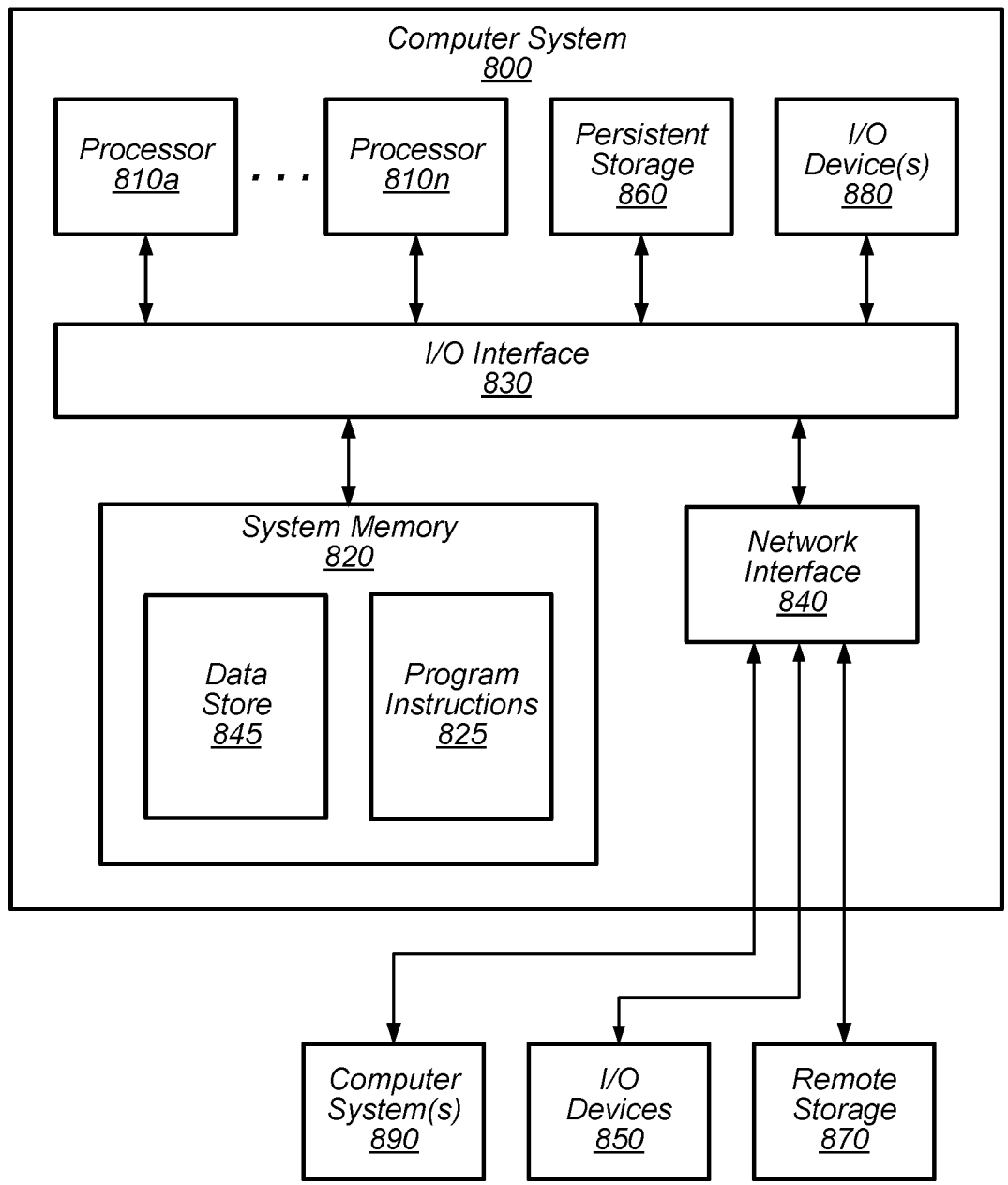
FIG. 8 is a block diagram illustrating a computer system configured to implement at least a portion of a system that may include request routers, servers, and a separate distributed storage service, according to various embodiments.

FIG. 8 is a block diagram illustrating a computer system configured to implement at least a portion of a system that may include request routers, servers, and a separate distributed storage service, according to various embodiments.

Illustrative System

Any of various computer systems may be configured to implement processes associated with a technique for seamless scaling via proxy replay of session state. For example, FIG. 8 is a block diagram illustrating one embodiment of a computer system suitable for implementing some or all of the techniques and systems described herein. For example, each of the computer systems may host one or more servers (e.g., servers 140, 142, head nodes 320*a-c*) request routers 120, storage service 150 or 310, control system 130 or client(s) 110. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various of the illustrated embodiments may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable applications, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 820 as program instructions 824. In some embodiments, system memory 820 may include data 825 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client device (e.g., 110) and other computer systems, or among hosts, for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the archive, compactor and query proxy for data stream service, other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors and memory configured to implement a plurality of servers; and
one or more processors and memory configured to implement a request router to route traffic between the plurality of servers and respective client connections;
one or more processors and memory configured to implement a control system to:
determine to scale with respect to a first server of the plurality of servers based at least in part on:
receipt of a request from a client to scale the first server to a lesser or greater capacity, or
a determination that a workload of the first server is below a minimum workload threshold or greater than a maximum workload threshold; and
instruct instantiation of a, or obtain identification of an already-instantiated, second server with lesser or greater capacity than the first server;
the first server to send, from the first server to the request router, identification of the second server to which connections of the first server will be transferred and session state information for one or more connections handled by the first server, wherein the session state information is distinct from the identification of the second server, and wherein the request router routes traffic for the one or more connections between the first server and one or more corresponding existing client connections;
wherein for respective connections of the one or more connections the request router is to:
establish a new connection between the request router and the second server;
replay the session state information for the connection to the second server via the new connection, wherein the session state information replayed by the request router to the second server is the session state information sent by the first server to the request router; and route traffic between the corresponding existing client connection and the corresponding new connection to the second server.

2. The system as recited in claim 1, wherein to send the identification and the session state information to the request router, the first server is to send the identification and the session state information over the same connection between the first server and the request router that is used to carry traffic of the corresponding existing client connection from the request router to the first server.

3. The system as recited in claim 1, wherein:
the request router is a client-side driver; and
the corresponding existing client connection is an internal connection between the client-side driver and a client process.

4. The system as recited in claim 1, further comprising:
a data storage service that stores client data and acts as a data source for the first and second servers, wherein after the connections are transferred to the second server, the second server responds to requests received via the existing client connection without changing the source of the data in the data storage service.

5. A method, performed on or across one or more computing devices, the method comprising:
determining to scale with respect to a first server based at least in part on:
determining by a control system that a workload of the first server is below a minimum workload threshold or greater than a maximum workload threshold, or
a request from a client to scale the first server to a lesser or greater capacity;
instructing instantiation of a second server or obtaining identification of an already-instantiated second server, wherein the second server has lesser or greater capacity than the first server;
receiving, by a request router, identification of the second server to which connections of the first server will be transferred and session state information for each of the connections handled by the first server from the first server to the request router, the session state information distinct from the identification of the second server, wherein the request router routes traffic for each connection between the first server and a corresponding existing client connection;
for each of the connections:
establishing a new connection between the request router and the second server, and
replaying, by the request router, the session state information for the connection to the second server over the new connection, wherein the session state information replayed by the request router to the second server is the session state information received by the request router from the first server; and
routing traffic by the request router between each existing client connection and the corresponding new connection to the second server.

6. The method of claim 5, wherein said receiving identification of the second server comprises receiving the identification of the second server in a first termination packet over the same connection between the first server and the request router that is used to carry traffic of the corresponding existing client connection from the request router to the first server.

7. The method of claim 6, further comprising:
subsequent to said receiving the identification of the second server in the first termination packet:
sending a second termination packet to the first server over the connection, and
receiving back the second termination packet from the first server over the connection, wherein receiving back the second termination packet from the first server indicates that all session state information from the first server has been replayed back to the second server.

8. The method of claim 5, further comprising:
determining, by the control system, a target capacity for scaling the first server that is less than or greater than the current capacity of the first server; and
wherein said instructing instantiation of the second server or obtaining identification of an already-instantiated second server is performed such that the second server has the target capacity.

9. The method of claim 5, further comprising:
determining that all of the connections with the first server have been transferred away from the first server; and
releasing, based at least in part on said determining, the resources implementing the first server to a resource pool.

10. The method of claim 5,
wherein said receiving, said establishing, said replaying and said routing are performed in response to said request.

11. The method of claim 5, further comprising:
subsequent to receiving the identification of the second server,
saving, based at least in part on identifying a safe point in the processing by the first server, updates to a volume associated with the processing, and
closing the volume.

12. The method of claim 5, further comprising:
prior to the first server sending the identification of the second server to the request router,
responding, by the first server, to requests for client data with client data from a data store; and
subsequent to said routing traffic by the request router between each existing client connection and the corresponding new connection to the second server,
responding, by the second server, to requests for client data with client data from the data store, wherein the second server responds to the requests without changing the source of the data from the data store.

13. One or more non-transitory computer readable storage media storing program instructions that, when executed one or across one or more processors, cause the one or more processors implement a request router configured to perform:
responsive to initiation of a server scaling process that adds or withdraws server resources, wherein the initiation of the server scaling process comprises receiving a request from a client to scale a first server to a lesser or greater capacity, or determining that a workload of the first server is below a minimum workload threshold or greater than a maximum workload threshold:
instructing instantiation of a, or obtaining identification of an already-instantiated, second server with lesser or greater capacity than the first server;
receiving, by the request router, identification of the second server to which connections of the first server will be transferred and session state information for each of the connections handled by the first server, wherein the session state information is distinct from the identification of the second server, and wherein the request router routes traffic for each connection between the first server and a corresponding existing client connection;

for each of the connections:
  establishing a new connection between the request router and the second server, and
  replaying the session state information for the connection to the second server over the new connection, wherein the session state information replayed by the request router to the second server is the session state information received by the request router from the first server; and
  routing traffic by the request router between each existing client connection and the corresponding new connection to the second server.

14. The one or more non-transitory computer readable storage media of claim 13, wherein said receiving identification of the second server comprises receiving the identification of the second server in a first termination packet over the same connection between the first server and the request router that is used to carry traffic of the corresponding existing client connection from the request router to the first server.

15. The one or more non-transitory computer readable storage media of claim 14, wherein the program instructions further configure the request router to perform:
  subsequent to said receiving the identification of the second server in the first termination packet:
    sending a second termination packet to the first server over the connection, and
    receiving back the second termination packet from the first server over the connection, wherein receiving back the second termination packet from the first server indicates that all session state information from the first server has been replayed back to the second server.

16. The one or more non-transitory computer readable storage media of claim 13,
  wherein the program instructions further cause the one or more processors to perform:
    determining, by a control system, a target capacity for scaling the first server that is less than or greater than the current capacity of the first server; and
    instructing, by the control system, instantiation of the second server such that the second server is instantiated at the target capacity.

17. The one or more non-transitory computer readable storage media of claim 13, wherein the program instructions further cause the one or more processors to perform:
  determining that all of the connections with the first server have been transferred away from the first server; and
  releasing, based at least in part on said determining, the resources implementing the first server to a resource pool.

18. The one or more non-transitory computer readable storage media of claim 13,
  wherein the program instructions further cause the one or more processors to perform said establishing, said replaying and said routing responsive to the request.

19. The one or more non-transitory computer readable storage media of claim 13, wherein the program instructions further cause the one or more processors to perform:
  subsequent to receiving the identification of the second server,
    saving, based at least in part on identifying a safe point in the processing by the first server, updates to a volume associated with the processing, and
    closing the volume.

20. The one or more non-transitory computer readable storage media of claim 13, wherein the program instructions further cause the one or more processors to perform:
  prior to the first server sending the identification of the second server to the request router,
    responding, by the first server, to requests for client data with client data from a data store; and
  subsequent to said routing traffic by the request router between each existing client connection and the corresponding new connection to the second server,
    responding, by the second server, to requests for client data with client data from the data store, wherein the second server responds to the requests without changing the source of the data from the data store.

* * * * *